F. T. HAGUE.
COMMUTATING MEANS FOR DYNAMO ELECTRIC MACHINES.
APPLICATION FILED AUG. 7, 1916.

1,371,620.

Patented Mar. 15, 1921.

WITNESSES:
R. J. Fitzgerald
D. C. Davis

INVENTOR
Floyd T. Hague.
BY
Wesley G. Carr
ATTORNEY

UNITED STATES PATENT OFFICE.

FLOYD T. HAGUE, OF PITTSBURGH, PENNSYLVANIA, ASSIGNOR TO WESTINGHOUSE ELECTRIC AND MANUFACTURING COMPANY, A CORPORATION OF PENNSYLVANIA.

COMMUTATING MEANS FOR DYNAMO-ELECTRIC MACHINES.

1,371,620.   Specification of Letters Patent.   Patented Mar. 15, 1921.

Application filed August 7, 1916. Serial No. 113,458.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Commutating Means for Dynamo-Electric Machines, of which the following is a specification.

My invention relates to commutating means for dynamo-electric machines, such, for example, as generators and rotary converters, and it has for its object to provide apparatus of the character designated that shall permit a given machine to run at a higher speed than would otherwise be possible or at a higher kilowatt output at the same speed without any increase in its reactance or commutation voltage.

Figure 1:
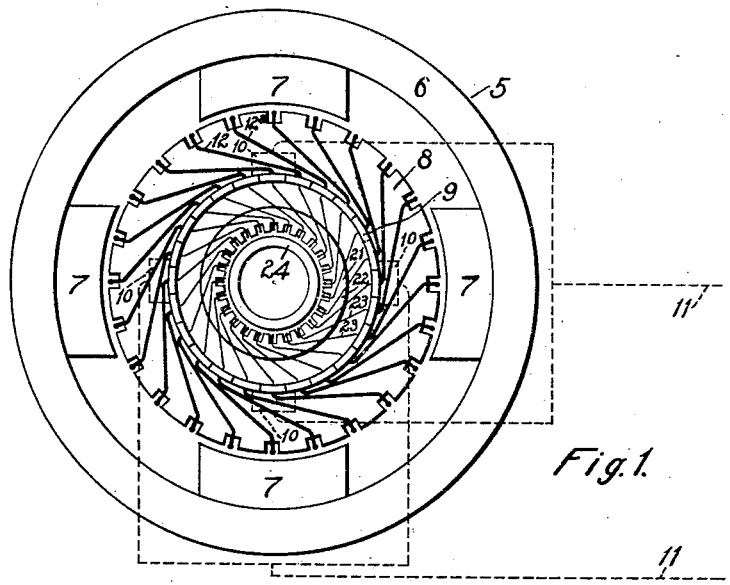
Figure 2:
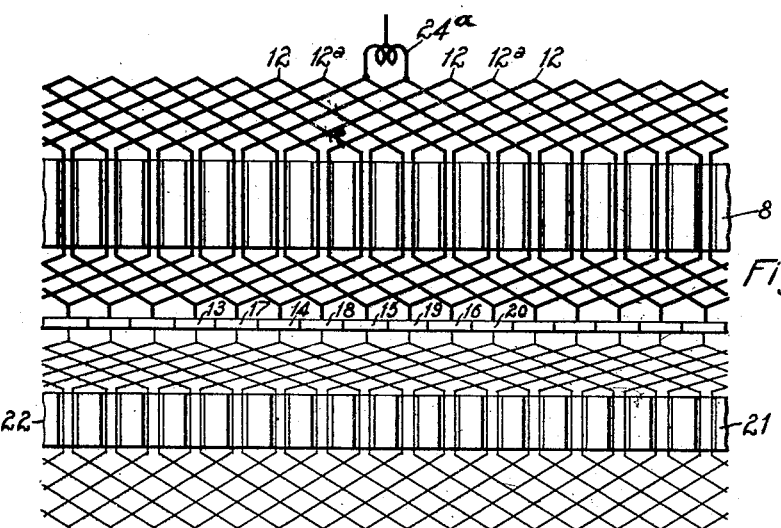
Figures 3, 4:
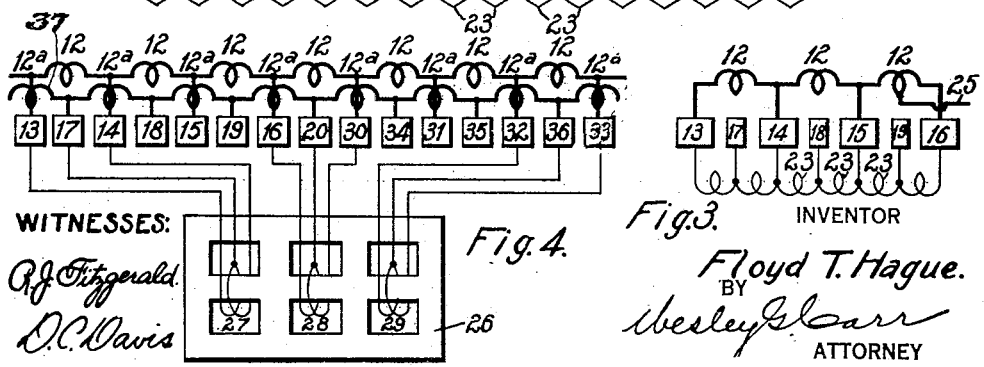

In the accompanying drawing, Figure 1 is a diagrammatic view of a dynamo-electric machine embodying a preferred form of my invention; Fig. 2 is a developed view of the armature windings and of the commutator of the machine shown in Fig. 1; and Figs. 3 and 4 are developed views of modified types of windings involving my invention.

The minimum number of commutator bars per pole which may be successfully used in a dynamo-electric machine is determined by the maximum voltage existing between adjacent bars at any instant. A low-voltage, high-speed machine inherently requires only a few active commutator bars to commutate its low voltage. There is a minimum number of armature slots and commutator bars which may be used if the width of the zone of commutation midway between the poles is to be kept within the limits of the practice that has heretofore obtained. If the zone of commutation is permitted to extend under the main field poles, commutation trouble will result, while, if the main pole inclosure is made smaller to allow a wide commutating zone, the design is disproportionate and uneconomical.

By my invention, I provide the armature of a dynamo-electric machine with two separate singly reëntrant sandwiched armature windings and connect each of these windings to alternate commutator bars. I then provide suitable auxiliary apparatus for maintaining a smooth potential gradient around the entire commutator cylinder, insuring that each commutator bar shall, at all times, be intermediate in potential between its neighboring bars, irrespective of the winding to which such bars may be connected.

In a modified form of my invention, I provide an armature with a single winding, connecting suitable points in said winding to main or active segments of a commutator cylinder, and I further provide auxiliary segments between the main segments of each neighboring pair and suitably energize such auxiliary segments so that they tend to split the commutation voltage existing between the said main segments. By this means, I reduce the voltage at the break occurring at the brush tip to permissible limits and, therefore, either improve the commutation of a given machine or permit an increase in the rating of a machine without changing the degree of commutation.

A machine the armature winding of which bears a general resemblance to the winding which I have devised, is shown on page 387, Fig. 228, of S. P. Thomson's "*Dynamo-Electric Machinery*" published by Spon & Chamberlain, New York city (1904) but that winding comprises two distinct sandwiched windings in which a coil of one winding has a phase different of twice the slot pitch with respect to the adjacent coil of the other winding which is connected to the neighboring commutator bar. When a brush is bridging two commutator bars, the phase difference causes the development of an appreciable electromotive force in a closed armature circuit and a consequent disastrous production of circulating currents, the two commutator segments being temporarily brought to the same potential by the bridging action of the brush.

By my invention, I provide auxiliary means, comprising either a separate armature winding or an auxiliary transformer, for forcing a proper alinement of the potentials of all the commutator segments, and this forced alinement results in the provision of a counter electromotive force to oppose the unbalanced electromotive force which is tending to cause the circulating currents.

For a more detailed understanding of my invention, attention is directed to Figs. 1 and 2 of the drawing wherein a dynamo-electric machine 5 comprises a field frame 6, provided with pole pieces 7—7, and an armature 8. The armature 8 is provided with a commutator cylinder 9 upon which bear suitable brushes 10—10 to which main current leads 11—11 are connected. The armature 8 is provided with two singly reëntrant sandwiched windings 12 and 12ª, as clearly shown in Fig. 2, each of which has a forward pitch of 7 slots and a backward pitch of 5 slots. The armature winding 12 is connected to alternate commutator segments 13, 14, 15, 16, etc., as shown, and in like manner, the winding 12ª is connected to commutator segments 17, 18, 19, 20, etc.

An auxiliary armature 21 is mounted on the shaft of the main armature 8 and preferably comprises a toothed rotor 22 provided with a winding 23—23 mounted to rotate adjacent to a fixed or stator member 24 which may or may not be provided with field windings, as desired, as will hereinafter more fully appear. As shown in Fig. 2, the winding 23—23 is of the simple, single, reëntrant pitch type having a forward pitch of seven slots and a backward pitch of six slots and is connected to each of the commutator bars previously mentioned in order: namely, 13, 17, 14, 18, 15, etc. While I have shown the auxiliary winding 23—23 as connected to the main windings 12—12 and 12ª—12² through the commutator bars, it may equally well be connected through the rear ends of the armature coils of the windings 12—12 and 12ª—12ª or to other symmetrically located points therein. The function of the auxiliary machine is to force the alinement of the potentials of the commutator bars so that each bar will always have a potential midway between that of the adjacent bars except when a segment is under a brush. Since the auxiliary machine is essentially an alternator in parallel with another alternator, (the main winding) it may have a continuous field structure without winding of any kind, except possibly a damper winding, being similar to the field structures sometimes employed in phase converters and like apparatus and deriving its exciting current from the other machine. For various reasons, this type of field structure appears to be more desirable for my purpose than one in which definite poles are provided with a few windings.

Considering first the case of the two separate main windings, each being in alternate slots and each having one commutator bar per slot; the auxiliary winding will have the same total number of slots per pole but may have a smaller number of poles if the auxiliary machine has a continuous field and no damper winding, provided the main windings are cross-connected for every commutator bar. The field excitation of the auxiliary machine is so adjusted (in the case of salient poles) that both windings generate approximately the same volts per commutator bar, but the auxiliary winding is just enough lower in voltage so that the main winding will supply all of the current which is to be commutated. In the case of an auxiliary machine having a continuous field structure, all of its excitation will be drawn from the main-machine winding, as magnetizing current, and its excitation will inherently be just low enough so that it will not supply any real kilowatt output to the commutator. It will also have a field form identical with that of the main machine under all conditions of excitation and load.

It will be noticed that the auxiliary machine has twice as many commutator bars per pole as either main winding, and it follows, if the auxiliary machine is sufficiently large to maintain the commutator bars to which it is connected in their correct relative polarities, that these bars will stay in their correct relative positions, while the main winding supplies current to them, as the chief tendency to disturb the alinement is the short-circuiting action of the brushes. The effect of field distortion caused by load on the main winding, will be duplicated in the field form of the auxiliary machine by means of local magnetizing currents. This is automatically cared for and appears to be in the direction of reducing distortion on the main machine. On this basis, it would appear that the machine having a continuous field structure would be preferable because its adjustments of excitation are perhaps more automatic than with salient poles and separate excitation.

With main windings having two or more commutator bars per slot, the same considerations apply. The auxiliary machine must have sufficient capacity and be of sufficiently low self-induction to offset the action of the main brushes which tend to bring adjacent points of the two windings to the same potential and also to offset the fact that the windings occupy the same slots, in some cases. In any event, the auxiliary machine is to supply magnetizing current only to force the alinement of commutator bars, and, as such, may be a very small machine. Considering the most unfavorable case in which there is only one turn per commutator bar, due to the fact that the number of its bars is double the number of bars for the main winding, the section of iron per pole is only one-half that of the main machine and, if the majority of the commutator bars are cross-connected, the auxiliary machine need have only two poles, provided it has a continuous field structure and has no damper winding.

The application to rotary converters of a commutating system of the character indicated involves tying the collector leads to the two windings through small choke coils 24ª of such design that the main alternating current will flow through them without substantial impedance, but any local current from coil to coil must encounter the total self-induction.

The influence of the auxiliary winding in parallel with the current-supplying winding is favorable to improving commutation because it always constitutes a non-current-carrying, parallel path through which the reactance or stored energy of the main coils undergoing commutation may be instantaneously discharged rather than be discharged at the commutator face in the form of an arc.

The use of auxiliary machines is open to the objection that, in the case of the continuous field-structure type, its magnetizing current is supplied from the main armature and will increase the copper losses to some extent. It should not be necessary to connect every commutator bar of the main winding to the auxiliary winding, as only a few connections per pole should suffice to permanently locate the relative positions of the windings. The actual connections between these windings might be made sufficiently few in number to permit the connections between the two windings to be made through slip rings, thus allowing the auxiliary machine to be mounted on a separate shaft or permitting any other external combination.

While the two separate windings are not cross-connected, except each on itself, they are, in effect, interconnected by the auxiliary machine and each should take its proportional share of current.

If the auxiliary machine is mounted on the main shaft, it may have any number of poles, so long as the stator has no damper winding. If it is mounted external to the main machine, it may also have any number of poles, regardless of whether the stator has or has not damper windings. It is to be noted that relative rotation between the rotor and stator is not essential to the theory of operation.

As is obvious from Fig. 1, it is possible to omit one of the current-carrying windings on the main armature, while retaining the full number of commutator bars. This arrangement will result in alternate bars being semi-dead in the sense that they will not carry any load current, and, as such, these bars may be made narrower than those carrying main current. They will, however, retain such relative voltage relation that each bar between current-carrying bars will be approximately half-way in voltage between these bars, and the net result will be, so far as voltage distribution around the commutator is concerned, the same as though the main winding were wound with twice as many active commutator bars as it actually has. The application of this type of winding to a rotary converter involves the use of no choke oil in the alternating-current leads from the collector. A structure of this character is shown in Fig. 3 which is believed to be self-explanatory, a suitable tap for connection to the slip ring of a rotary converter being shown at 25.

The auxiliary winding disclosed to this point, particularly of the type having a field member without an exciting winding, may be considered an auto-transformer of many phases having a rotating field flux, and it should not be considered as the equivalent of plain resistance or of a choke coil. The auxiliary winding is the seat of an electromotive force which may be so adjusted in phase and in magnitude as to neutralize the harmful armature electromotive forces tending to establish circulating currents. A resistance or choke coil is an inefficient substitute for the auxiliary winding of my machine because of the inherent severe distortion of the voltage relations when devices of this character deliver current.

I have found that, with two sandwiched armature windings of the character described, it is necessary to tie the two windings together through a source of electromotive force at but three points per pair of poles in order to fix the relative potentials of said windings. Accordingly, if three or more magnetic circuits are used, it is possible to wind each circuit to have a counter electromotive force equal to that of one coil of one winding as a minimum value. The intermediate winding is connected to the center of said coil, thus fixing its potential.

A structure of this character is indicated in Fig. 4 wherein an armature winding 12—12 is sandwiched with an armature winding 12ª—12ª, as before, and connections are made to commutator segments as shown in Fig. 2. A transformer 26 having a core structure, similar in construction to that of the ordinary three-phase transformer, is provided and, upon said core, are mounted three windings 27, 28 and 29. The terminals of the winding 27 are connected, respectively, to the commutator bars 13, 14; that is to say, are connected across the terminals of a coil 37 of the armature winding 12, and the intervening commutator bar 17 is connected to the mid point of the winding 27. Thus, the alternating electromotive force or the potential of the commutator bar 17, as it rotates, is at all times, the same as that of the mid-point of said armature coil 27 connected to the other winding. In a similar manner, the transformer winding 28 is bridged across the commutator segments 16 and 30 which are in connection with the armature winding 12, and its mid-point is connected to the segment 20 which is connected to the armature winding 12ª and, likewise, the transformer winding 29 is associated with the commutator bars 32, 36 and 33. The three interlinkings thus produced between the two armature windings are sufficient to maintain the relative potential of all points of said windings at the proper amounts, although, obviously, more interlinkings may be provided, if found desirable.

I claim as my invention:

1. The combination with a dynamo-electric machine provided with a commutator and a plurality of armature windings, of connections from different points in one of said windings to certain segments of said commutator, and connections from different points in another of said windings to other segments of said commutator, said two groups of commutator segments being intermingled, and means connected to said commutator segments and embodying a seat of electromotive force for maintaining the potential of each commutator segment intermediate the potentials of the two immediately adjacent commutator segments.

2. The combination with a dynamo-electric machine provided with a commutator and "$n$" armature windings, of connections from $\frac{1}{n}$th of the segments of said commutator, substantially equally spaced therearound, to a corresponding number of substantially equally spaced points in one of said windings, and similar connections from each of the remaining windings to a corresponding group of commutator segments, and means connected to said commutator segments and embodying a seat of electromotive force for maintaining the potential of each commutator segment intermediate the potentials of the two immediately adjacent commutator segments.

3. The combination with a dynamo-electric machine provided with two distinct armature windings and a commutator, of connections from alternate commutator segments to a like number of substantially equally spaced points in one of said windings, and connections from the remaining commutator segments to similar points in the other winding, and means connected to said commutator segments and embodying a seat of electromotive force for maintaining the potential of each commutator segment intermediate the potentials of the two immediately adjacent commutator segments.

4. The combination with a dynamo-electric machine provided with a commutator and a plurality of armature windings, of connections from different points in one of said windings to certain segments of said commutator, and connections from different points in another of said windings to other segments of said commutator, said two groups of commutator segments being intermingled, an additional inductive winding, and connections from two points therein to separate commutator bars which are connected to one of said armature windings, and a connection from a point of said additional winding intermediate said two points to a commutator bar connected to another armature winding and disposed intermediate said two commutator segments which are in intimate connection.

5. The combination with a dynamo-electric machine provided with a commutator and "$n$" armature windings, of connections from $\frac{1}{n}$th of the segments of said commutator, substantially equally spaced therearound, to a corresponding number of substantially equally spaced points in one of said windings, and similar connections from each of the remaining windings to a corresponding group of commutator segments, an additional inductive winding, and connections from two points therein to separate commutator bars connected to one of said armature windings, and a connection from a point of said additional winding intermediate said two points to a commutator bar connected to another armature winding and disposed intermediate said two commutator segments which are in intimate connection.

6. The combination with a dynamo-electric machine provided with two distinct armature windings and a commutator, of connections from alternate commutator segments to a like number of substantially equally spaced points in one of said windings, and connections from the remaining commutator segments to similar points in the other winding, an auto-transformer, connections from two terminals thereof to two commutator segments connected to one of said armature windings, a connection from a third terminal of said transformer to a commutator segment connected to the other armature winding and lying between the two commutator segments of the first mentioned armature winding.

In testimony whereof, I have hereunto subscribed my name this 27th day of July, 1916.

FLOYD T. HAGUE.